United States Patent [19]

Laude

[11] Patent Number: 4,591,237

[45] Date of Patent: May 27, 1986

[54] COUPLER EXTRACTING AN OPTICAL SIGNAL

[75] Inventor: Jean-Pierre Laude, St Cyr la Riviere, France

[73] Assignee: Instruments SA, France

[21] Appl. No.: 541,747

[22] Filed: Oct. 13, 1983

Related U.S. Application Data

[63] Continuation-in-part of Ser. No. 372,716, Apr. 28, 1982, abandoned.

[30] Foreign Application Priority Data

Nov. 18, 1982 [FR] France .................................. 82 19284

[51] Int. Cl.[4] ................................................. G02B 6/26
[52] U.S. Cl. .................................. 350/96.15; 350/96.16; 350/96.18
[58] Field of Search ............... 350/96.15, 96.16, 96.18, 350/96.20

[56] References Cited

U.S. PATENT DOCUMENTS

| | | | |
|---|---|---|---|
| 3,883,223 | 5/1975 | Hudson | 350/96.16 |
| 4,479,697 | 10/1984 | Kapany et al. | 350/96.18 |
| 4,484,793 | 11/1984 | Laude | 350/96.20 |

FOREIGN PATENT DOCUMENTS

| | | | |
|---|---|---|---|
| 2435732 | 4/1980 | France | 350/96.16 |
| 0148390 | 5/1981 | German Democratic Rep. | 350/96.16 |

*Primary Examiner*—John Lee
*Attorney, Agent, or Firm*—Handal & Morofsky

[57] ABSTRACT

A coupler extracting an optical signal between an upstream fiber (1) and a downstream fiber (2) to ensure the continuity of transmission from (1) to (2) and at the same time to extract through (3) a part of the signal and to inject from (4) towards (2) a new signal, a coupler employing a spherical mirror (17) by object-image conjugation of the two fibers (1, 2) which are arranged symmetrically relative to the center ($C_1$) of the mirror. According to the invention it comprises a second spherical partial mirror (13) with the same equatorial plane (11) as the first mirror and placed between the first mirror (17) and the plane (11). The centers ($C_1$) and ($C_2$) of the two mirrors are offset in the plane (11) and the fibers (3) and (4) are arranged symmetrically to (1) and (2) relative to the center $C_2$ of the mirror (13).

5 Claims, 6 Drawing Figures

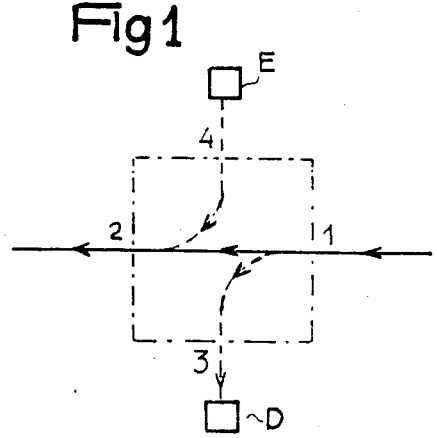
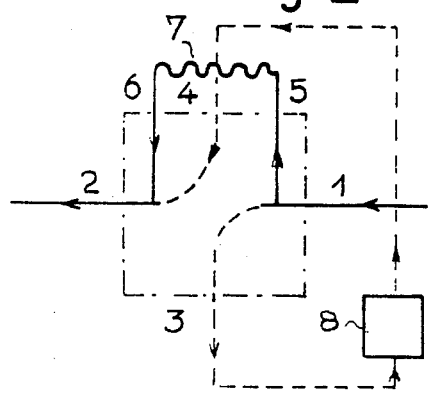
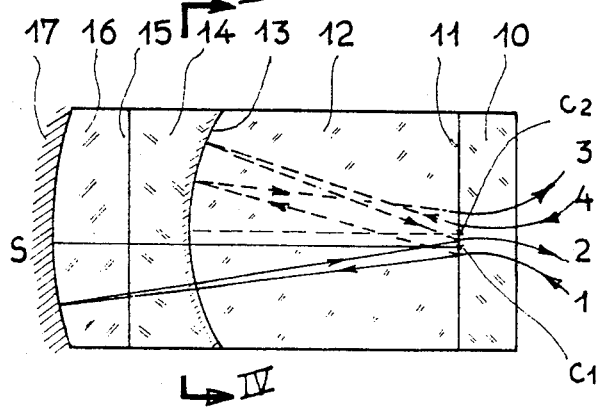
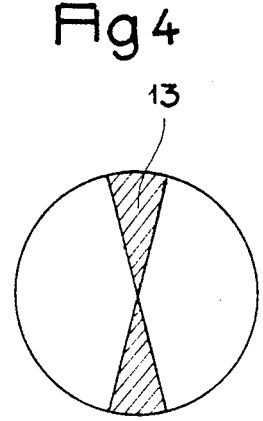
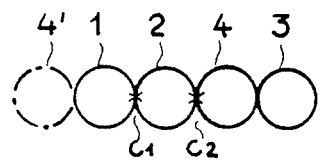
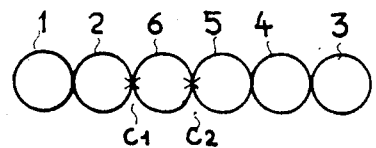

COUPLER EXTRACTING AN OPTICAL SIGNAL

CROSS-REFERENCE TO RELATED APPLICATION

This application is a continuation in part of copending United States patent application Ser. No. 372,716 of Laude entitled Coupling Extracting Device for Optical Signal and filed Apr. 28, 1982 (now abandoned).

The present invention relates to a device for coupling and extracting a signal transmitted by optical fibers. It is more particularly intended to be inserted in an optical fiber for transmission so as to permit, while maintaining the continuity of transmission of the initial signal through the device in the upstream to downstream direction, to extract a part of the signal towards a detector, and at the same time to reintroduce a new signal in the downstream direction; this new signal can, moreover, also be the same extracted signal after regeneration, or another signal carrying new information to be superimposed on the initial information.

BACKGROUND

The known devices employed at present for this purpose comprise generally, between the upstream transmission fiber and the downstream transmission fiber, an optical system intended to make parallel the light rays produced by the upstream fiber, and an optical system focusing the parallel beam anew on the entry of the downstream fiber. In the part where the rays are parallel, the device comprises a semi-reflecting system which withdraws a controlled fraction of the light towards a detector or any other receiver system.

Such a device has the disadvantage, when it is intended to reintroduce a new signal, that the semi-reflecting surface allows the passage of a part of the reintroduced light, which then passes directly towards the detector and falsifies the information which is collected thereat.

French patent application No. 81/08,636 published under the No. 2,505,056 of the same Applicant provides a first solution to this problem by means of a device comprising a main concave spherical mirror whose central part forms another small concave spherical deflecting mirror, with the same apex and the same radius as the main mirror, but whose center $C_2$ is slightly offset relative to the center $C_1$ of the main mirror. The main mirror therefore ensures the continuity of transmission of the greater part of the optical signal between an upstream fiber and a downstream fiber which are arranged symmetrically relative to $C_1$, while the small central deflecting mirror permits a part of the signal to be withdrawn towards an extraction fiber arranged symmetrically to the upstream fiber relative to $C_2$, and to introduce a new signal through a reinjection fiber arranged symmetrically to the downstream fiber relative to $C_2$.

However, the manufacture of such a complex mirror, with a small central part whose axis is diverted relative to the main axis, presents technical and economic problems and does not lend itself well to large scale industrial manufacture.

SUMMARY OF THE INVENTION

The invention brings a new solution and applies to a coupler extracting an optical signal, between an upstream input transmission fiber and a downstream output transmission fiber, intended at the same time to ensure the continuity of the transmission between the fibers, to extract a part of the signal towards a detector, and/or to couple to the downstream fiber a new signal coming from a transmitter, a coupler of the type comprising a concave spherical mirror with an apex S and a center $C_1$, and in which the end of the upstream transmission fiber is arranged in the plane P which is perpendicular at $C_1$ to the axis $SC_1$ in a position which is slightly offset relative to $C_1$ so that its image by the mirror is formed symmetrically relative to $C_1$ on the end of a receiving fiber.

According to the invention it comprises a second concave spherical partial mirror placed between the first mirror and the plane P, this second mirror, which is partially reflecting with zones distributed symmetrically relative to its apex, having its center $C_2$ in the plane P but slightly offset relative to the center $C_1$ of the mirror; moreover, the ends of the fiber communicating with the detector and of the fiber communicating with the transmitter are arranged, in the plane P symmetrically, respectively, to the end of the upstream fiber and of the downstream fiber relative to $C_2$.

According to a preferred embodiment of the invention, the whole unit consists of a single piece and the centers $C_1$ and $C_2$ are offset by a distance which is equal to the diameter of the fibers while the ends of the fibers are contiguous and aligned in the direction $C_1$–$C_2$.

The invention will be better understood by reference to a particular embodiment given by way of example and illustrated by the attached drawings.

BRIEF DESCRIPTION OF THE DRAWINGS

FIGS. 1 and 2 are functional diagrams showing the capabilities of the device. FIG. 1 relates to the case of a partial extraction of the signal and an injection of another independent signal. FIG. 2 relates to the case where the part of the extracted signal is reinjected after regeneration, while the main part of the signal is transmitted, being given a slight delay.

FIG. 3 is a simplified illustration of a coupler-extractor in a single piece according to the invention.

FIG. 4 is a cross-section along IV—IV of FIG. 3.

FIGS. 5 and 6 show the relative positions of the fibers abutting on the coupler-extractor in the cases, respectively, of the functional diagrams of FIGS. 1 and 2.

DETAILED DESCRIPTION

Referring firstly to FIG. 1, it will be seen that the coupler-extractor shown here as a dot-and-dash line receives upstream the optical fiber 1 carrying a signal part of which is to be transmitted to the downstream fiber 2 along the direct trajectory shown symbolically by a full line. Another function of the device is to extract a part of the signal to divert it towards the fiber 3 connected to a detector D; it also has to ensure the injection into the downstream fiber 2 of the additional signal produced by the transmitter E and transmitted through the fiber 4. The deflection and injection trajectories are shown symbolically by broken lines.

According to the diagram of FIG. 2 the signal which is withdrawn and deflected towards the fiber 3 is regenerated at 8 to be then reinjected through the fiber 4 towards the downstream fiber 2. Since the regeneration circuits 8 can cause a delay in the signal reinjected at 4 relative to the directly transmitted initial signal, the two signals are here restored into phase by obliging the light transmitted from 1 to 2 to follow an additional trajectory in an intermediate retarding fiber 7. This retarding fiber is connected to the apparatus by its ends 5 and 6.

Referring now to FIGS. 3 and 4, which correspond to the diagram of FIG. 1, it will be seen that the four fibers, 1, 2, 3 and 4 are immersed in a block 10 in such a manner that their ends are flush with the planar face 11 of the block. The four fibers are aligned in relative positions which will be specified later. The surface 11 forms the contact interface with another transparent block 12 whose other end forms a spherical surface 13 whose center $C_2$ is in the plane 11. The surface 13 is treated to be partially reflecting, the reflecting zones being arranged in a symmetrical manner relative to the apex defined by the principal diameter perpendicular to the plane 11. FIG. 4 shows an example of distribution of the reflecting zones, in two opposite sectors in this case. The block 12 is extended by a third transparent block 14, with the same refractive index as the block 12, and comprising a spherical surface conjugate with the surface 13 and a planar surface 15 parallel to the plane 11. The last block 16, also with the same refractive index, is in planar contact with the face 15, and its other face 17 forms a spherical mirror whose center $C_1$ is also situated in the plane 11.

The position of the block 16 is adjusted relative to the block 12 by sliding on the surface 15 in such manner that the two centers $C_1$ and $C_2$ are slightly offset in the plane 11. The assembly is also adjusted in such a manner that, as can be seen better in FIG. 5, the fibers 1 and 2 are arranged symmetrically relative to $C_1$ while, in the same alignment, the fibers 3 and 4 are respectively in a position which is symmetrical to fibers 1 and 2 relative to $C_2$. After adjustment the blocks are cemented together to form a single piece assembly.

The light issued from the fiber 1 meets first the surface 13 which, with its reflecting zones, sends a small part of it towards the point which is symmetrical with the fiber 1 relative to $C_2$, that is to say towards the fiber 3, and this part is thus deflected towards the detector D.

The greater part of the light passes through the transparent part of the surface 13 and is reflected by the mirror 17 towards the point which is symmetrical with the fiber 1 relative to $C_1$, that is to say towards the fiber 2.

Similarly, the light issued from the fiber 4 is partly reflected by the reflective zones 13 towards the point which is symmetrical with the fiber 4 relative to $C_2$, that is to say the fiber 2, which therefore thus receives at the same time the light issued from 1 and from 4.

The other part of the light which is issued from the fiber 4 and which has passed through the transparent zones of the surface 13 is reflected by the mirror 17 towards a point 4' which is symmetrical with the fiber 4 relative to $C_1$ (FIG. 5); this light comes out of the device.

It will be noted that, if a part of the light reflected towards the fiber 2, and in particular that of a high intensity coming from the transmitter through the fiber 4, instead of entering the fiber 2 completely is partly reflected by the end of the fiber to form an interference light, the latter will then follow the reverse path and, by virtue of the symmetrical shape of the reflecting zones 13, it will meet only the reflecting zones again and will be sent back towards 4 without disturbing the exit 3 towards the detector.

The device of FIG. 3 also permits the production of the layout of FIG. 2, by using six fibers whose ends are aligned in the plane 11, the relative positions being shown in FIG. 6.

Here again, the light issued from 1 is sent, by partial reflection by the partial mirror 13 and reflection of the remainder by the mirror 17, to the points symmetrical with 1 relative, respectively, to $C_2$ and $C_1$, that is to say to the deflecting fiber 3 and to the end 5 of the retarding fiber 7. Similarly, the regenerated signal introduced through 4, and the main light coming from 7 through 6 are united at the same downstream fiber 2, which is symmetrical with 4 relative to $C_2$ and symmetrical with 6 relative to $C_1$.

Naturally, the invention is not strictly limited to the embodiment which has been described by way of example, but it also covers the embodiments differing from it only in details, in alternative ways of implementation or in the use of equivalent means.

Thus the assembly could function in the same manner optically if the spherical mirrors 17 and 13 were separate mirrors maintained by appropriate means in the relative positions shown relative to the plane 11 containing the ends of the fibers and the centers of the mirrors. Nevertheless, the single piece construction described offers undeniable advantages regarding both the adjustment of the apparatus and the reliability of the component thus produced.

Similarly, the conditions of symmetry of the relative positions of the fibers relative to the centers $C_1$ and $C_2$ do not require that all the fibers be aligned, provided that their ends remain in the plane 11 and close to the centers $C_1$ and $C_2$. However, the device described, with the fibers aligned and contiguous, is easier to mass produce. The fact that the fibers are aligned and contiguous requires in this case that the distance between the centers $C_1$ and $C_2$ be equal to the diameter of a fiber.

I claim:

1. A coupler for extracting an optical signal traveling from a first upstream input transmission fiber to a downstream output transmission fiber, while allowing the continuity of transmission between the input and output fibers, by extracting a part of said optical signal for detection, and/or for coupling to the downstream fiber a new signal coming from a transmitter, comprising, a first concave spherical mirror with an apex and a first center, and in which the end of the upstream transmission fiber is arranged in a plane perpendicular at said first center to the axis defined by said apex and said first center, at a position which is slightly offset relative to said first center, whereby the image of said input fiber made by said mirror is formed symmetrically relative to said first center on the end of said downstream fiber, a second concave spherical mirror having a reflecting area smaller than the reflecting area of said first mirror and placed between the first mirror and said plane, said second mirror having limited area reflecting zones distributed symmetrically relative to its own apex, and having a second center in said plane, said second center being slightly offset relative to said first center of said first mirror, and wherein the ends of a third fiber communicating with a detector and of a fourth fiber communicating with a transmitter are arranged in said plane symmetrically, respectively, to the end of said first fiber and of said second fiber relative to said second center.

2. The coupler extractor as claimed in claim 1, which comprises an intermediate retarding optical fiber whose ends are arranged in said plane symmetrically, respectively, to the ends of the input and output fibers relative to said first center.

3. A coupler extractor device, comprising:
(a) a solid transparent member having first and second ends, said first end being configured and dimensioned to form a support for a focusing surface;
(b) reflective means, adjacent said first end, for forming a reflective focusing surface, said focusing surface having a first center of curvature;
(c) first light conducting means positioned proximate said second end and positioned at a first path end of a first path along which light may be sent, said first path end being centered on a first point and said first path extending toward said reflective focusing surface;
(d) limited area focusing means disposed in said transparent member between said first and second ends for reflecting a portion of the light which is emitted by said first light conducting means, said limited area focusing means being dimensioned to intercept only a portion of the light emitted by said first light conducting means, said limited area focusing means having a second center of curvature at a different position in space from the position of the center of curvature of said focusing surface;
(e) second light conducting means centered on a second point and proximate said second end and positioned at the end of said first path opposite said first path end of said first path, said first path extending from said first light conducting means to said reflective means to said second point for light not intercepted by said limited area focusing means and said first path extending from said first light conducting means to said limited area focusing means to a third point adjacent said second end for light intercepted by said limited area focusing means, said second point being symmetrical about said first center of curvature with said first point;
(f) third light conducting means positioned proximate said second end centered on said third point, said third point being symmetrical about said second center of curvature with said first point; and
(g) fourth light conducting means proximate said second end centered on a fourth point which is symmetrical about said second center of curvature with said second point.

4. A device as in claim 3 wherein, said transparent member comprises two individual transparent subelements divided by facing planar surfaces disposed between said reflective means and said limited area focusing means, said facing surfaces being configured, positioned and dimensioned to allow positional adjustment of said facing planar surfaces of said transparent subelements with respect to each other during assembly.

5. The coupler extractor as claimed in claims 1 or 2 or 3 or 4, wherein all of said fibers have the same diameter, and said first and second centers are offset by a distance which is equal to the diameter of the fibers, and the ends of each of the fibers are contiguous and aligned along the line defined by said first and second centers.

* * * * *